(12) United States Patent
Hollinrake et al.

(10) Patent No.: US 6,976,740 B1
(45) Date of Patent: Dec. 20, 2005

(54) BALL SCREW HOIST SYSTEM FOR VEHICLE

(75) Inventors: Mark S. Hollinrake, Marion, IA (US); Dan Banyas, Masonville, IA (US)

(73) Assignee: Henderson Manufacturing Company, Manchester, IA (US)

( * ) Notice: Subject to any disclaimer, the term of this patent is extended or adjusted under 35 U.S.C. 154(b) by 0 days.

(21) Appl. No.: 10/688,605

(22) Filed: Oct. 17, 2003

Related U.S. Application Data

(63) Continuation of application No. 10/193,221, filed on Jul. 10, 2002, now abandoned.

(60) Provisional application No. 60/304,240, filed on Jul. 10, 2001.

(51) Int. Cl.[7] ............................................... B60P 1/04
(52) U.S. Cl. ............................... 298/19 R; 298/22 D
(58) Field of Search ........................... 298/19 R, 22 J, 298/22 D; 254/3 R, 7 R, 98

(56) References Cited

U.S. PATENT DOCUMENTS

| 4,029,358 A | * | 6/1977 | Bergdolt | |
| 4,762,370 A | * | 8/1988 | Corompt et al. | 298/19 R |
| 5,513,901 A | * | 5/1996 | Smith et al. | 298/22 J |
| 6,561,589 B2 | * | 5/2003 | Jones | 298/19 B |

* cited by examiner

*Primary Examiner*—Stephen Gordon
(74) *Attorney, Agent, or Firm*—Leydig, Voit & Mayer, Ltd.

(57) ABSTRACT

A vehicle is disclosed which includes a chassis and a body pivotally secured to the chassis at a hinge. A hoist system is provided which extends between the body and the chassis for pivoting the body about the hinge between a storage position and a range of dumping positions. The hoist system includes a ball screw actuator, a trunion, and a push arm. The ball screw actuator is pivotally mounted to a frame member of the chassis and to the trunion, which in turn is mounted to the frame member. The push arm is pivotally mounted to the trunion and to the body.

3 Claims, 16 Drawing Sheets

FIG. 1

Performance Range Criteria

| Performance Range | Minimum Breakaway Torque (Inch-pounds) |
|---|---|
| Class 10 | 410,000 |
| Class 20 | 630,000 |
| Class 30 | 903,000 |
| Class 40 | 990,000 |
| Class 50 | 1,350,000 |
| Class 60 | 1,950,000 |
| Class 70 | 2,450,000 |
| Class 80 | 3,200,000 |
| Class 90 | 3,800,000 |
| Class 100 | 4,400,000 |
| Class 110 | 5,100,000 |
| Class 120 | 5,900,000 |

| NTEA CLASS | MINIMUM MOMENT (M) |
|---|---|
| | BREAK AWAY TORQUE (IN-LB) |
| 10 | 410,000 |
| 20 | 630,000 |
| 30 | 903,000 |
| 40 | 990,000 |
| 50 | 1,350,000 |
| 60 | 1,950,000 |
| 70 | 2,450,000 |
| 80 | 3,200,000 |
| 90 | 3,800,000 |
| 100 | 4,400,000 |
| 110 | 5,100,000 |
| 120 | 5,900,000 |

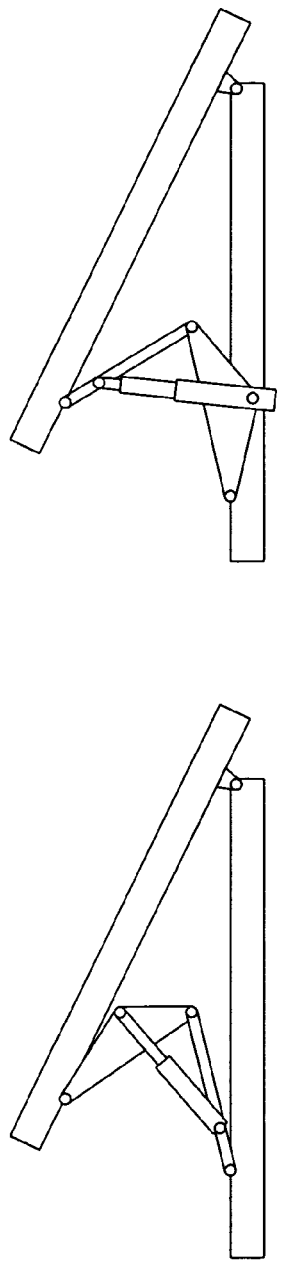
FIG. 4A
FIG. 4B
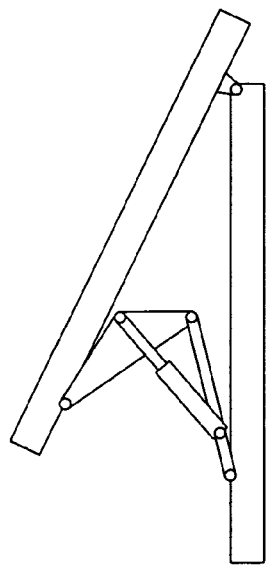
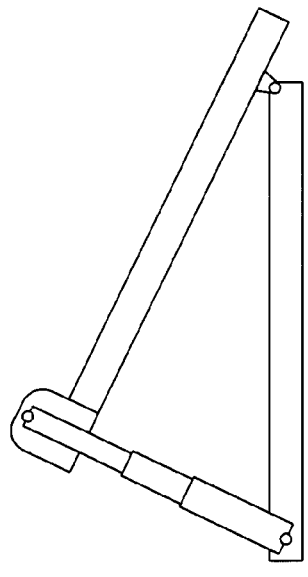
FIG. 4C
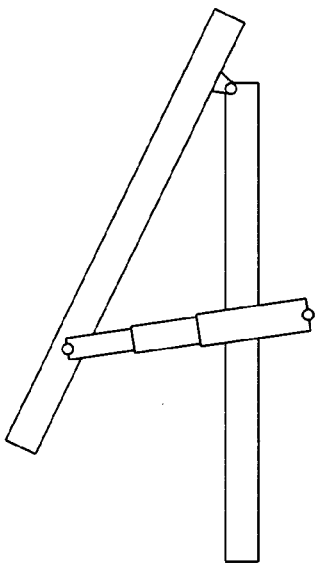
FIG. 4D

FIG. 7

Geometry

| L1 | L2 | B | C | C/B | L3 | F |
|---|---|---|---|---|---|---|
| 42 | 24 | 10.336 | 27.672 | 2.68 | -2.00 | 91,767 |
| 42 | 27 | 12.288 | 30.681 | 2.50 | -6.50 | 98,399 |
| 42 | 30 | 14.325 | 33.687 | 2.35 | -10.75 | 104,474 |
| 47 | 24 | 8.998 | 25.824 | 2.87 | 2.00 | 85,605 |
| 47 | 27 | 10.78 | 28.781 | 2.67 | -2.91 | 92,022 |
| 47 | 30 | 12.659 | 31.756 | 2.51 | -7.50 | 97,938 |
| 50 | 24 | 8.379 | 25.016 | 2.99 | 4.25 | 82,291 |
| 50 | 27 | 10.027 | 27.809 | 2.77 | -0.75 | 88,585 |
| 50 | 30 | 11.697 | 30.435 | 2.60 | -5.25 | 94,423 |
| 55 | 21 | 6.323 | 21.984 | 3.48 | 12.50 | 70,663 |
| 55 | 24 | 7.78 | 24.756 | 3.18 | 6.75 | 77,210 |
| 60 | 21 | 5.677 | 20.962 | 3.69 | 16.75 | 66,537 |
| 60 | 24 | 6.975 | 23.527 | 3.37 | 10.75 | 72,837 |

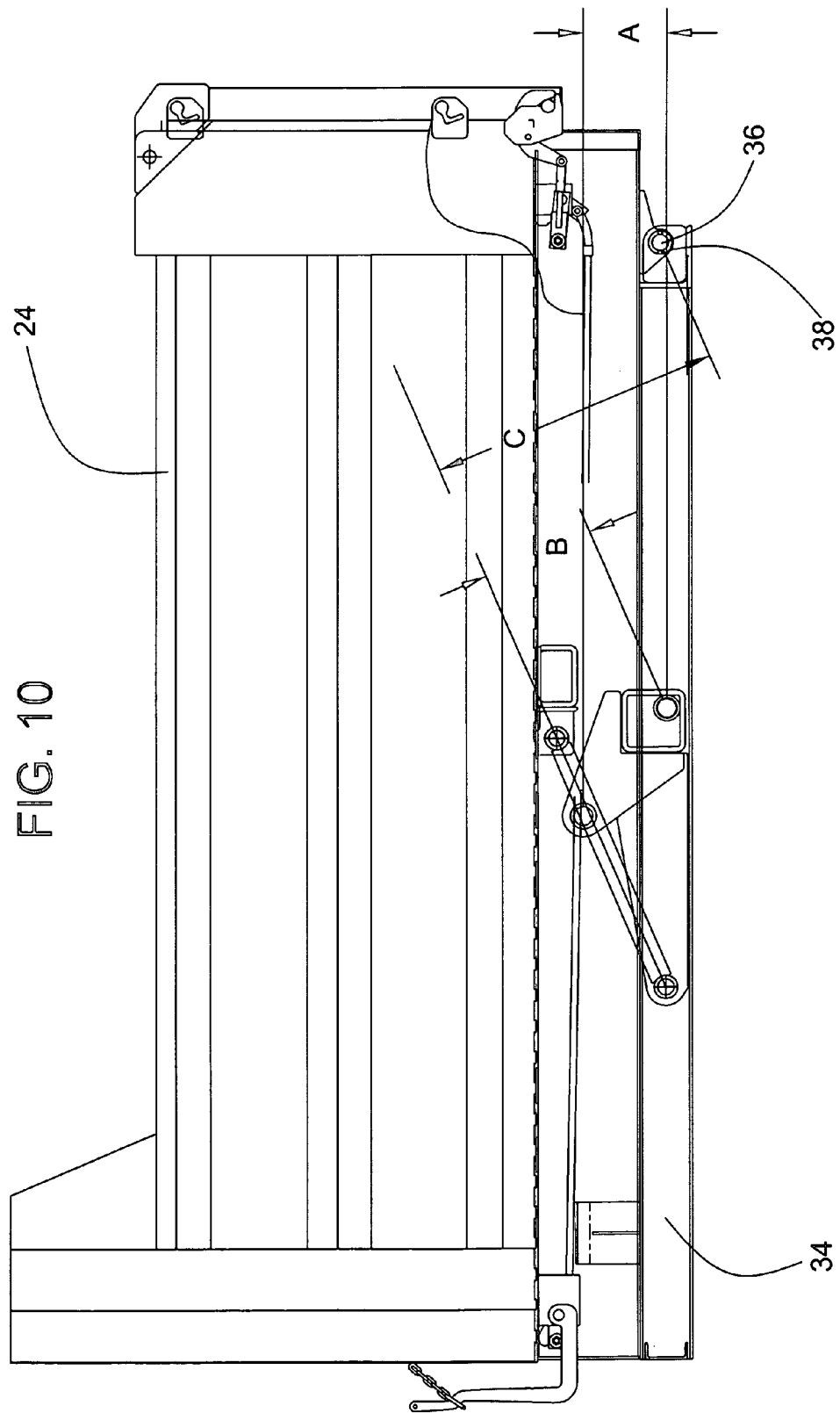

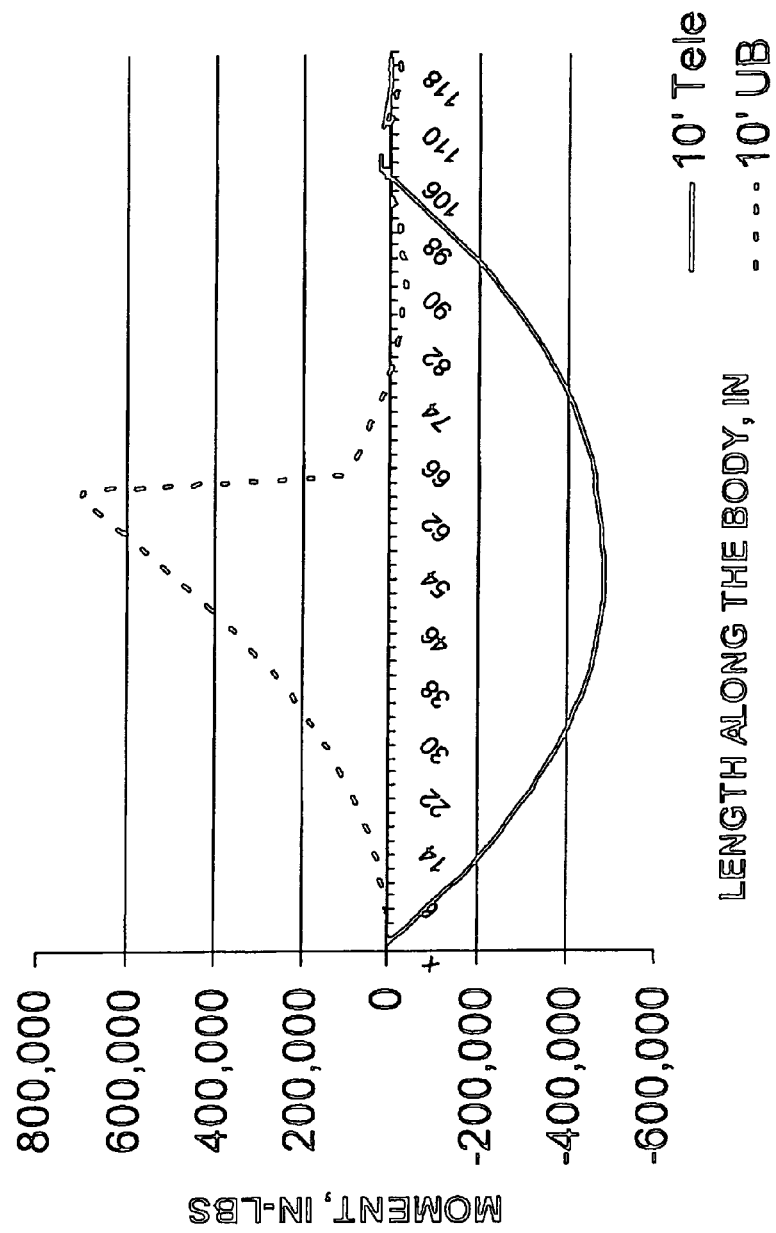

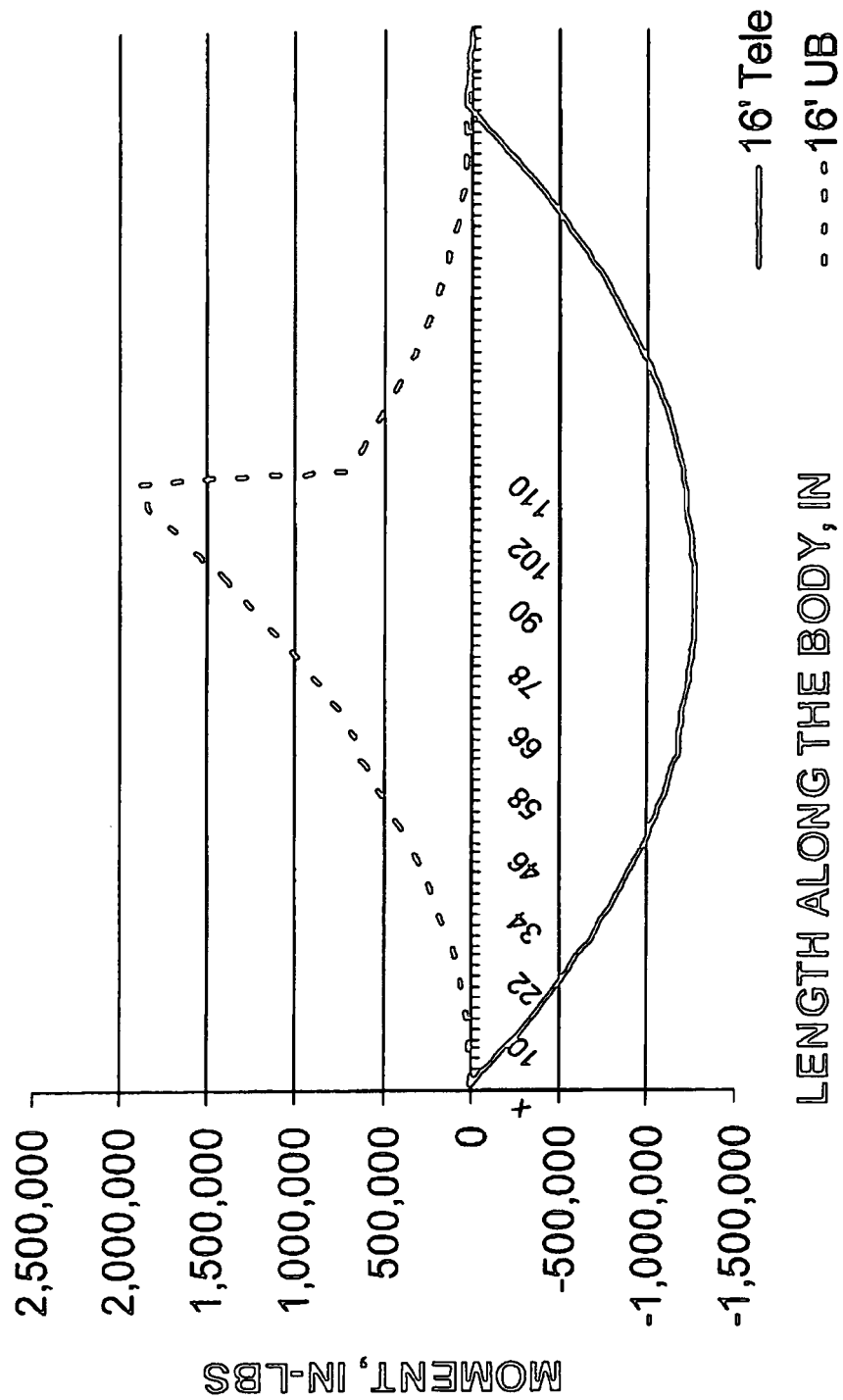

BALL SCREW HOIST SYSTEM FOR VEHICLE

CROSS-REFERENCE TO RELATED PATENT APPLICATIONS

This patent application is a continuation of U.S. patent application Ser. No. 10/193,221, filed Jul. 10, 2002, entitled "Ball Screw Hoist System," now abandoned which claims the benefit of priority to U.S. Provisional Application No. 60/304,240, filed Jul. 10, 2001, entitled "Ball Screw Hoist System," the entire disclosures of which is are incorporated in their entireties herein by this reference.

FIELD OF THE INVENTION

The present invention relates generally to a ball screw hoist system which can be used in a vehicle for selective movement of a dump body relative to a chassis.

BACKGROUND OF THE INVENTION

Many types of vehicles are available with an apparatus mounted thereon which provide for the dumping and optionally the spreading of material, such as sand, salt, gravel, asphalt and the like, onto a surface. One type of apparatus which provides this dual functionality is commonly referred to as a combination body. Combination bodies are so named because they provide, in combination, both dumping and spreading functions. Examples of combination bodies are provided by U.S. Pat. Nos. 5,400,974 and 5,772,389.

In general, dump bodies are pivotally mounted onto the chassis of a vehicle, typically a truck chassis. Although the bodies can be mounted so as to pivot in one or more directions, the most common mounting arrangement provides a hoist system having a hinge mechanism on the rear of the body and a hydraulic cylinder on the front of the body, wherein movement of the cylinder causes the body to pivot about the rear hinge mechanism. This pivoting movement provides the bodies with the ability to dump material from the rear of the bodies.

While existing hoist systems provide many desirable features and advantages, there remain certain problems with them. For example, hydraulic cylinders have certain drawbacks. In general, hydraulic cylinders become increasingly expensive as the size of the diameter of the cylinder and/or the length of the stroke of the cylinder increases. Furthermore, in many types of cylinders, a fixed casing is required for storing the movable portion of the cylinder which provides the desired stroke. The present invention is addressed toward overcoming these drawbacks.

BRIEF SUMMARY OF THE INVENTION

The invention provides a ball screw hoist system for a vehicle with a dump body. The vehicle includes a chassis with a frame member. The dump body is pivotally secured to the chassis at a hinge. The hoist system extends between the body and the chassis and is provided for pivoting the body about the hinge between a storage position and a range of dumping positions. The hoist system includes a ball screw actuator, a trunion, and a push arm. The ball screw actuator is pivotally mounted to the frame member and to the trunion. The trunion is pivotally mounted to the frame member and includes an arm having a distal end. One end of the push arm is pivotally mounted to the distal end of the arm, and the other end of the push arm is pivotally mounted to the body.

Advantageously, the ball screw actuator does not require a casing as does a hydraulic cylinder. Also, in general, a ball screw actuator of a given stroke is lighter and less expensive than a hydraulic cylinder that provides the same stroke. The decrease in weight can be very desirable in vehicular applications where gross vehicle weight is often a concern.

Advantageously, the ball screw actuator can provide the necessary stroke length to achieve the desirable torque and stability benefits derived from locating the hoist system further from the body pivot axis.

These and other features of the present invention will become apparent to one of ordinary skill in the art upon reading the detailed description, in conjunction with the accompanying drawings, provided herein.

BRIEF DESCRIPTION OF THE DRAWINGS

FIG. 1 is a table illustrating a classification system for hoists. Hoists are listed by class numerically. The hoists listed were classified by comparing the performance curve of the hoist to a set of standard performance curves through the complete lift cycle of 50 degrees. Performance range determinations and ton capacity listings were calculated using the following criteria: (1) liquid level, nondiminishing load; (2) minimum dump angle of 50 degrees; and (3) body overhang of 12 inches. All units and measures are in English units.

FIG. 7 is a table showing the relationship between the ratio of C/B to the hoist actuator force. The largest ratio of C/B corresponds with a lower ball screw force (F). The value of F is calculated by the following formula:

$$F = 1,950,000 / 7.937 / (C/B),$$

where 1.9500.000 (with units in·lb) represents the NTEA torque rating for Class 60 rating; and 7.937 (with units in) is the moment arm to ball screw from trunion pivot.

The efficiency can be maximized by maximizing C/B and the mounting height.

Figure 8:
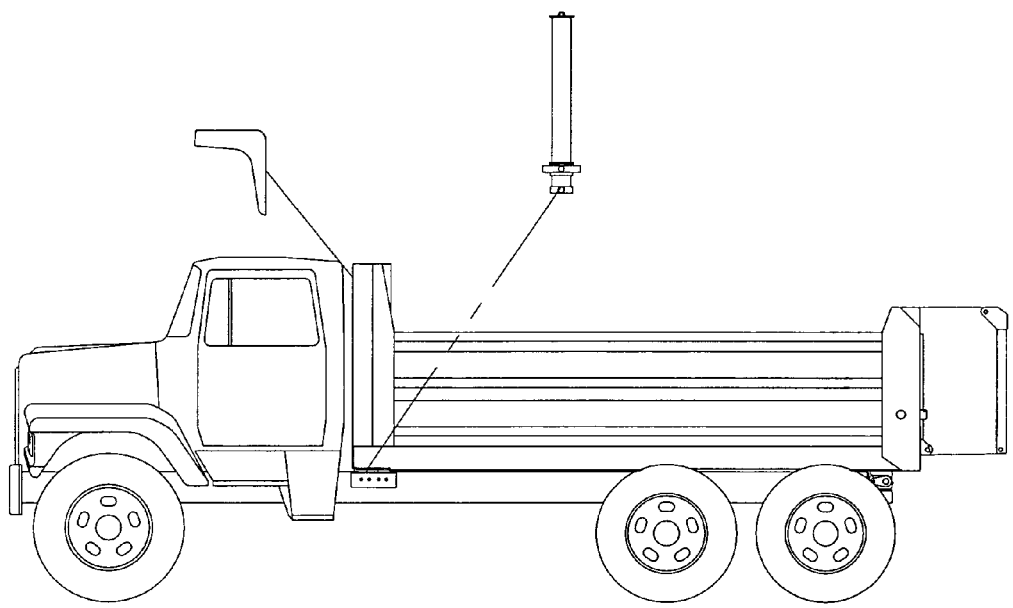

FIG. 8 is a side elevational view of a vehicle having a hoist system with a telescopic cylinder. The telescopic hoist cylinder can be mailhot or conventional, and can be a mounted by a cradle or a sub-frame mount.

Figure 9:
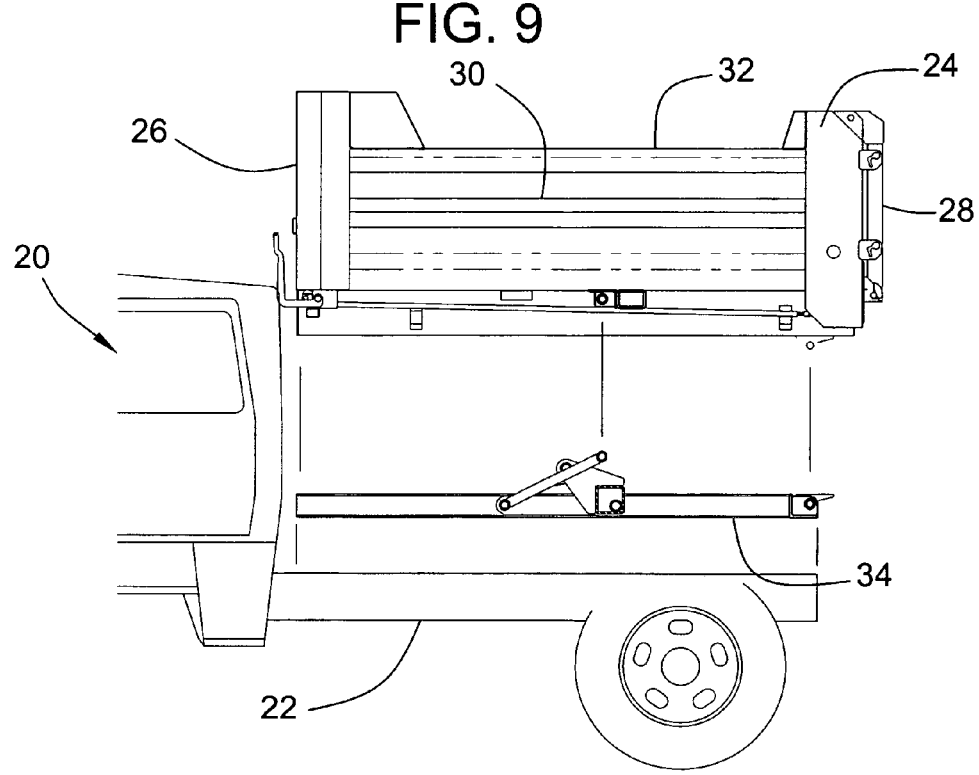

FIG. 9 is a fragmentary, partially exploded view of a vehicle having a hoist system according to the present invention.

FIG. 10 is a side elevational view of the frame member, the hoist system, and the body of the vehicle of FIG. 9.

Figure 11:
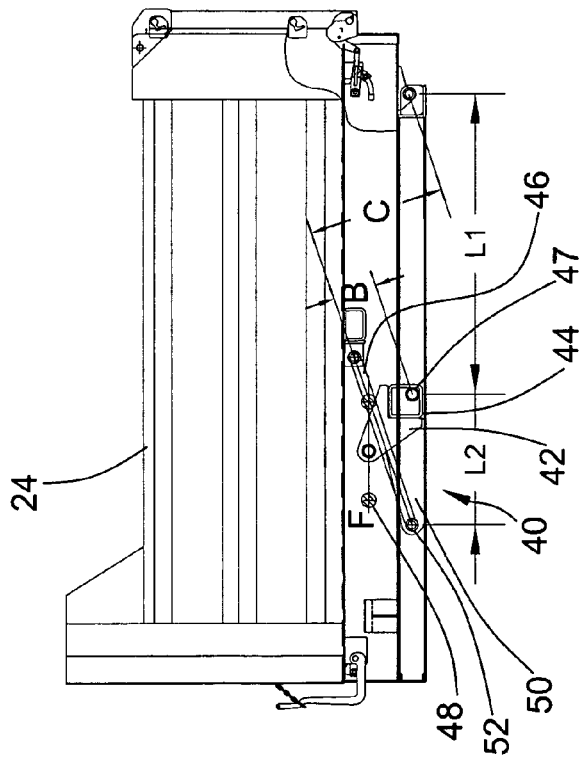

FIG. 11 is a view as in FIG. 10, showing the body in a storage position.

Figure 12:
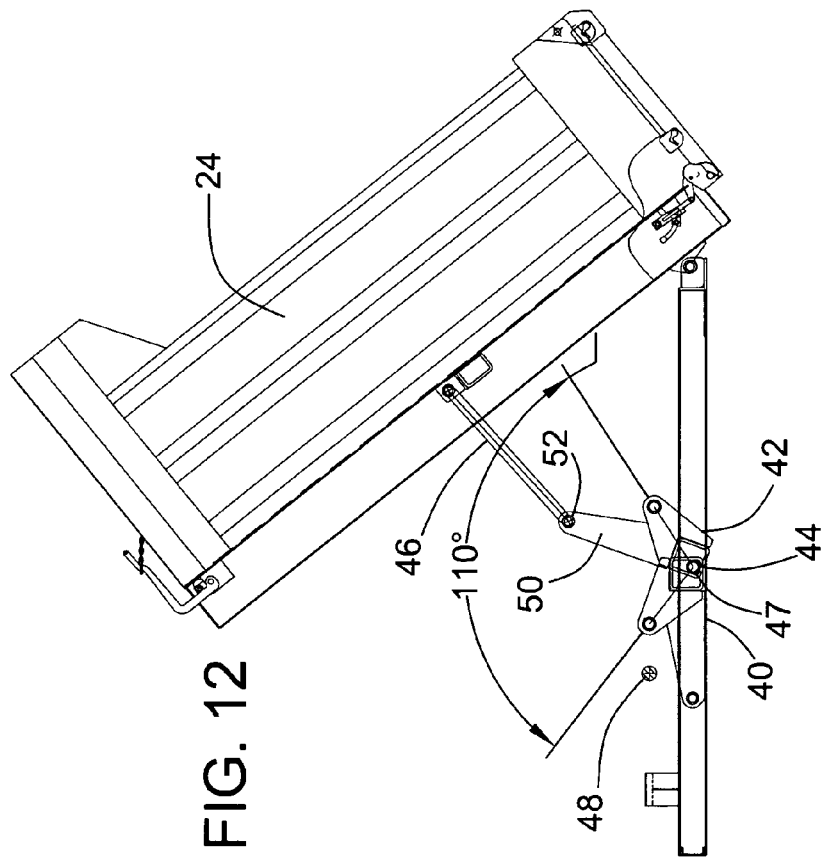

FIG. 12 is a view as in FIG. 10, showing the body in one of a range of dumping positions.

FIGS. 13 and 14 are a pair of moment diagrams which compare the hoist system of FIG. 8 (represented in FIG. 13) to the hoist system of FIG. 9 (represented in FIG. 14) by graphing the moment versus the length along the body.

Figure 15:
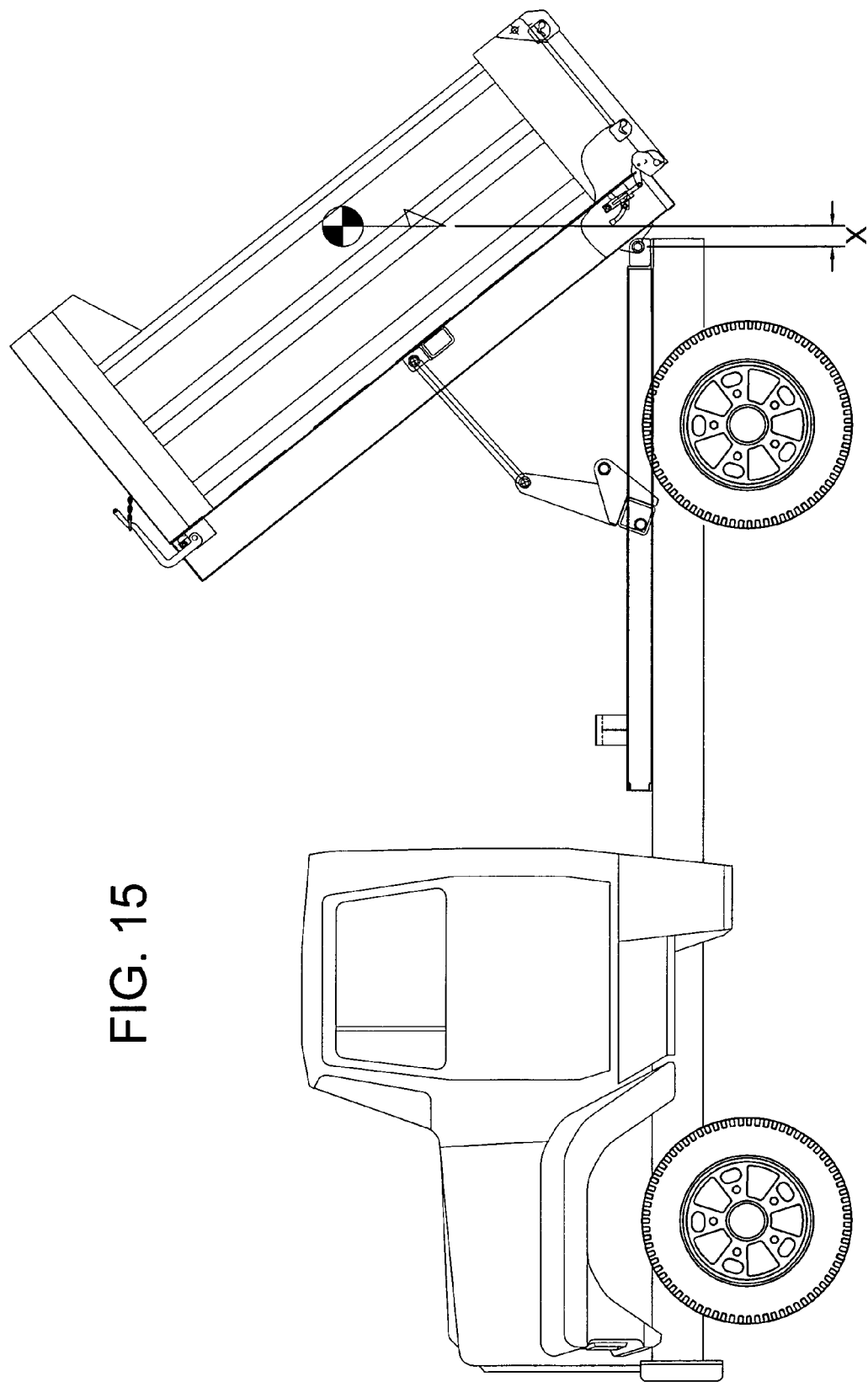
Figure 16:
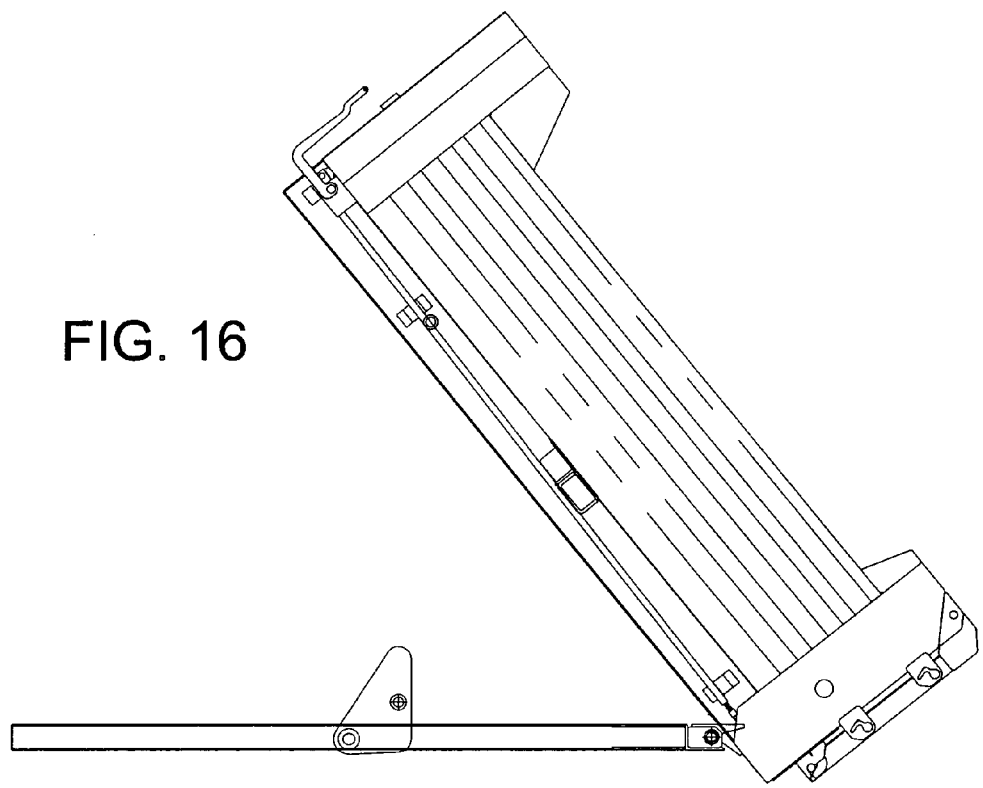
Figure 17:
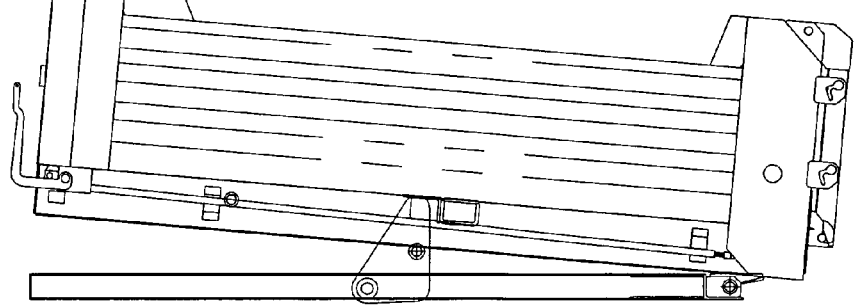
Figure 18:
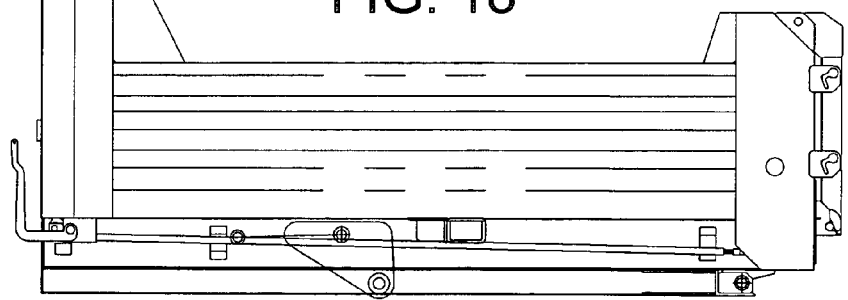
Figure 19:
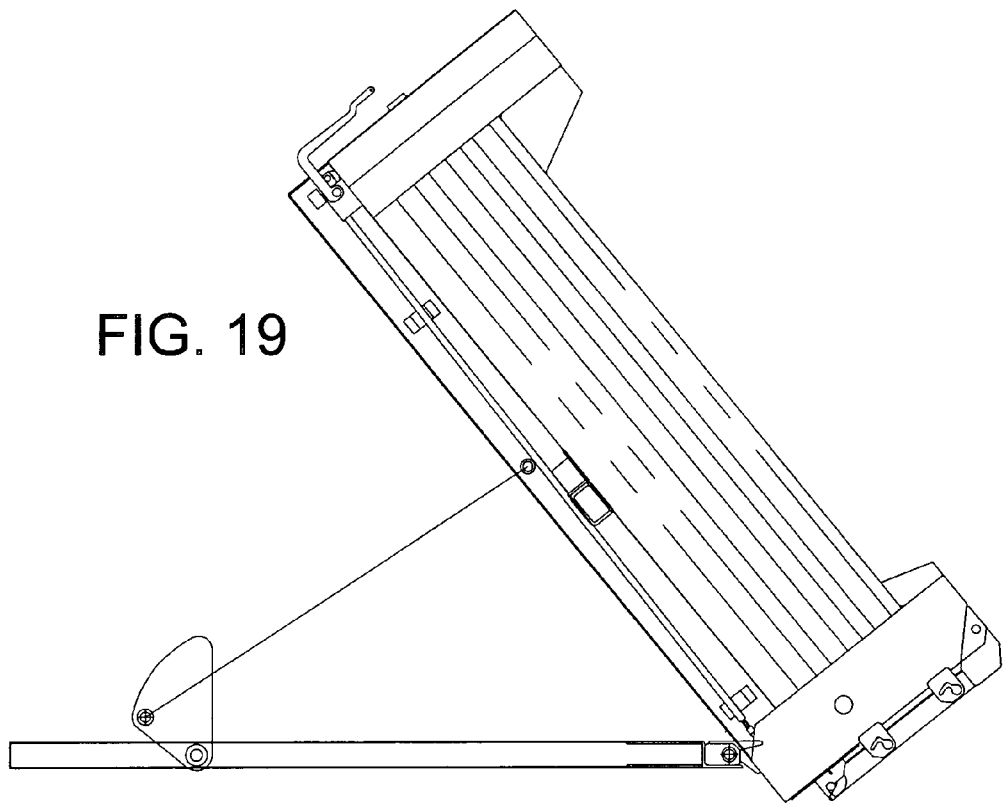
Figure 20:
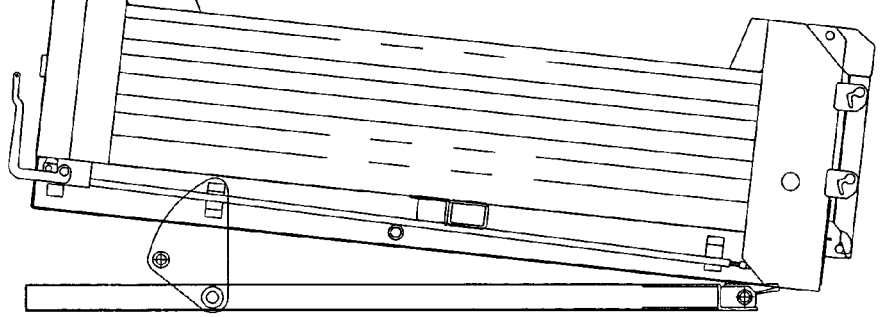
Figure 21:
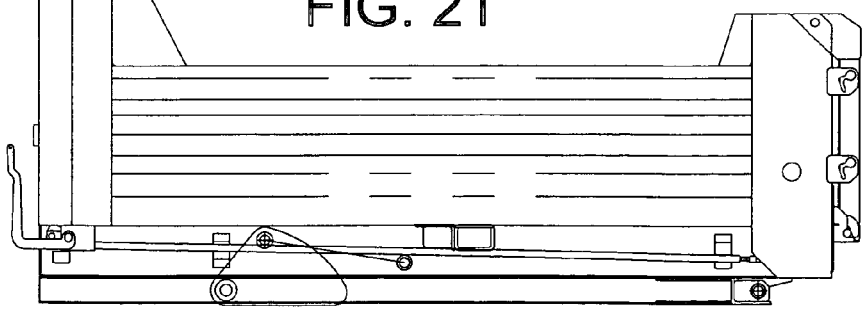

FIG. 15 is a side elevational view of another embodiment of a vehicle including a hoist system according to the present invention, showing the center of gravity of the body disposed beyond a rear pivot when the body is in a dumping position. Due to the geometry of certain hoist and body lengths, the center of gravity may be behind the rear pivot. In such cases, one of ordinary skill in the art will appreciate that the ball screw may be required to pull the body back down in such circumstances.

FIGS. 16–21 show fragmentary side elevational views of vehicles having a ball screw actuator according to the present invention.

DETAILED DESCRIPTION OF EMBODIMENTS OF THE INVENTION

A hoist system according to the present invention can be used in conjunction with many versions of a vehicle for storing materials and for dumping the stored materials. For example, the vehicles disclosed and claimed in U.S. Pat. No. 6,394,735, issued on May 28, 2002 and in U.S. Provisional patent Application No. 60/362,565, filed on Mar. 7, 2002, said patent and said application being incorporate herein in their entireties by this reference, can be modified to include the hoist system according to the present invention.

Turning now to the drawings, referring to FIGS. 1–4, dump body hoists can be rated according to certain set parameters and given a numerical class according to the performance of the hoist under these conditions. Essentially, the exemplary class rating is based upon the torque generated by the hoist system in moving the dump body through at least a 50°-dump angle from the chassis.

Figures 2, 3:
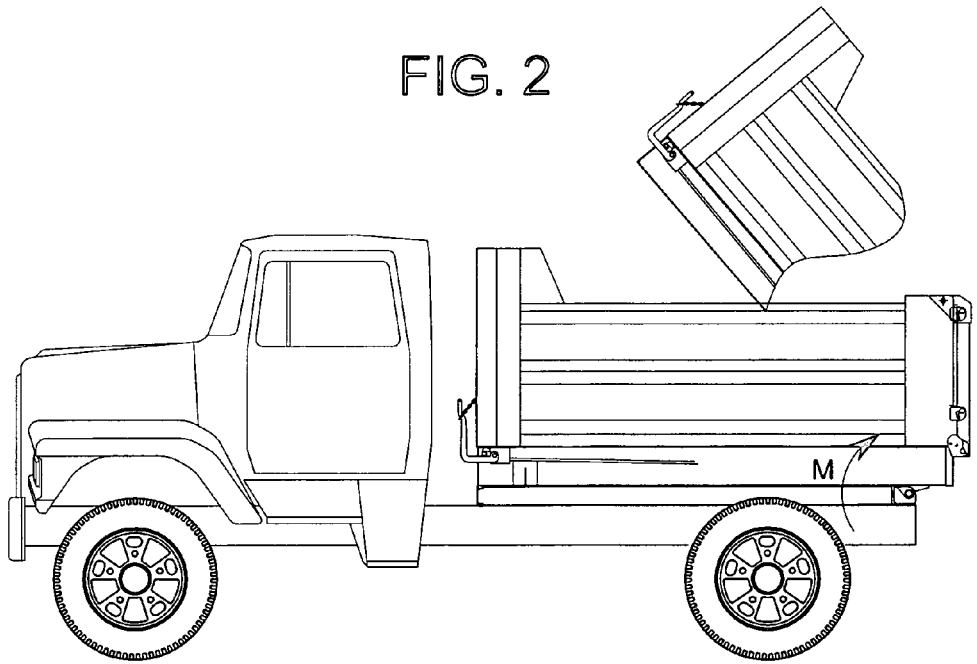
FIG. 2 is an illustrative side elevation of a vehicle with a dump body.
FIG. 3 is a table providing a minimum moment value for classes of the classification system of FIG. 1.
Figure 4E:
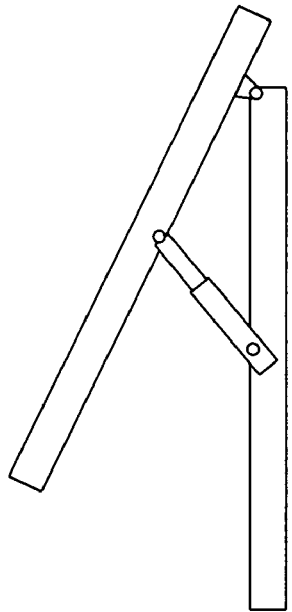
FIG. 4E illustrates an underbody hoist.
Figure 4F:
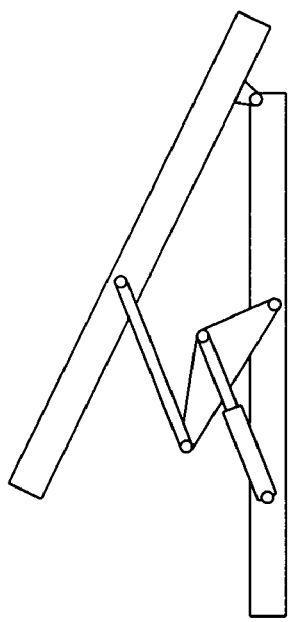
FIG. 4F provides an exemplary under body direct hoist system.
Figure 4G:
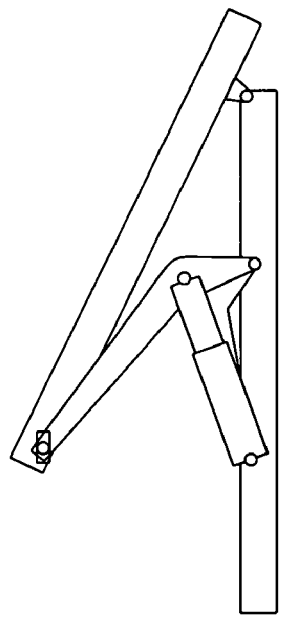
FIG. 4G provides a diagram of an exemplary hoist system with an underbody arm roller.
Figure 4H:
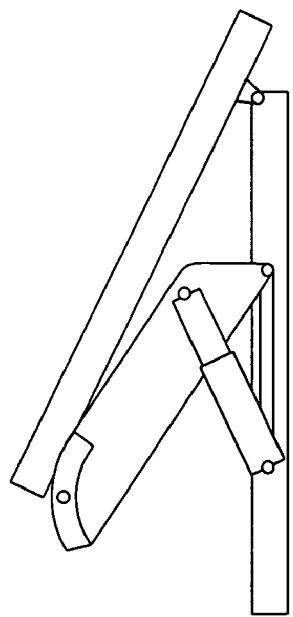
FIG. 4H depicts an exemplary hoist system with a lost motion scissor.
Figure 4:
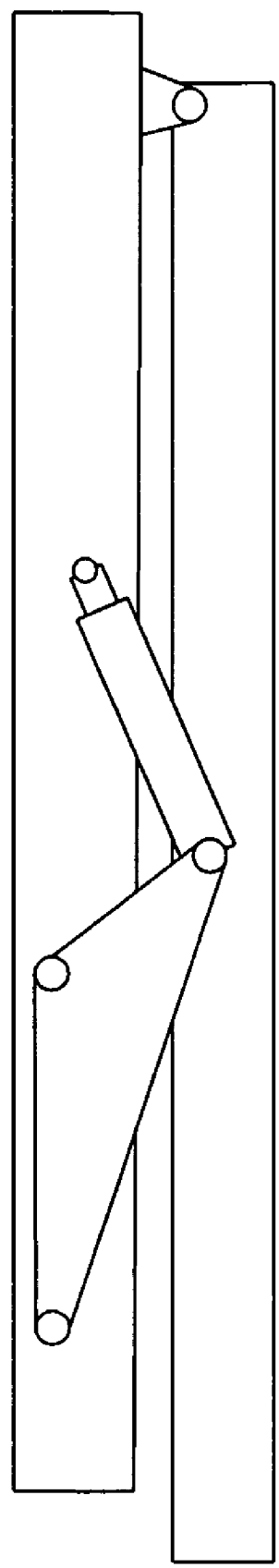
FIG. 4A illustrates a single stage scissors system.
FIG. 4B shows a diagram of an exemplary hoist system with a telescopic scissors system.
FIG. 4C depicts an exemplary hoist system with a standard telescopic hoist cylinder.
FIG. 4D is a diagram of an exemplary hoist system with a front mounted telescopic hoist cylinder.
FIG. 4I provides a diagram of an exemplary hoist system with the proposed Type IX hoist.
Figure 5:
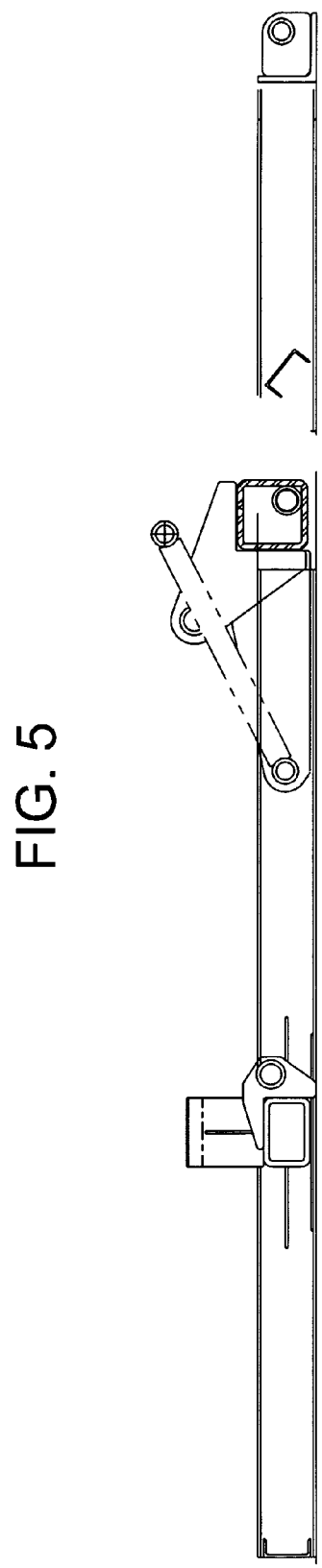
FIG. 5 is a fragmentary, somewhat schematic view of a hoist system according to the present invention.

Referring to FIG. 5, the torques generated by the hoist system of the present invention can be computed with the following equation:

$$T = \frac{Fac}{b},$$

where T is the torque,

F is the force generated by the hoist actuator, and a, b, and c are length measurements as shown in FIG. 5.

Figure 6:
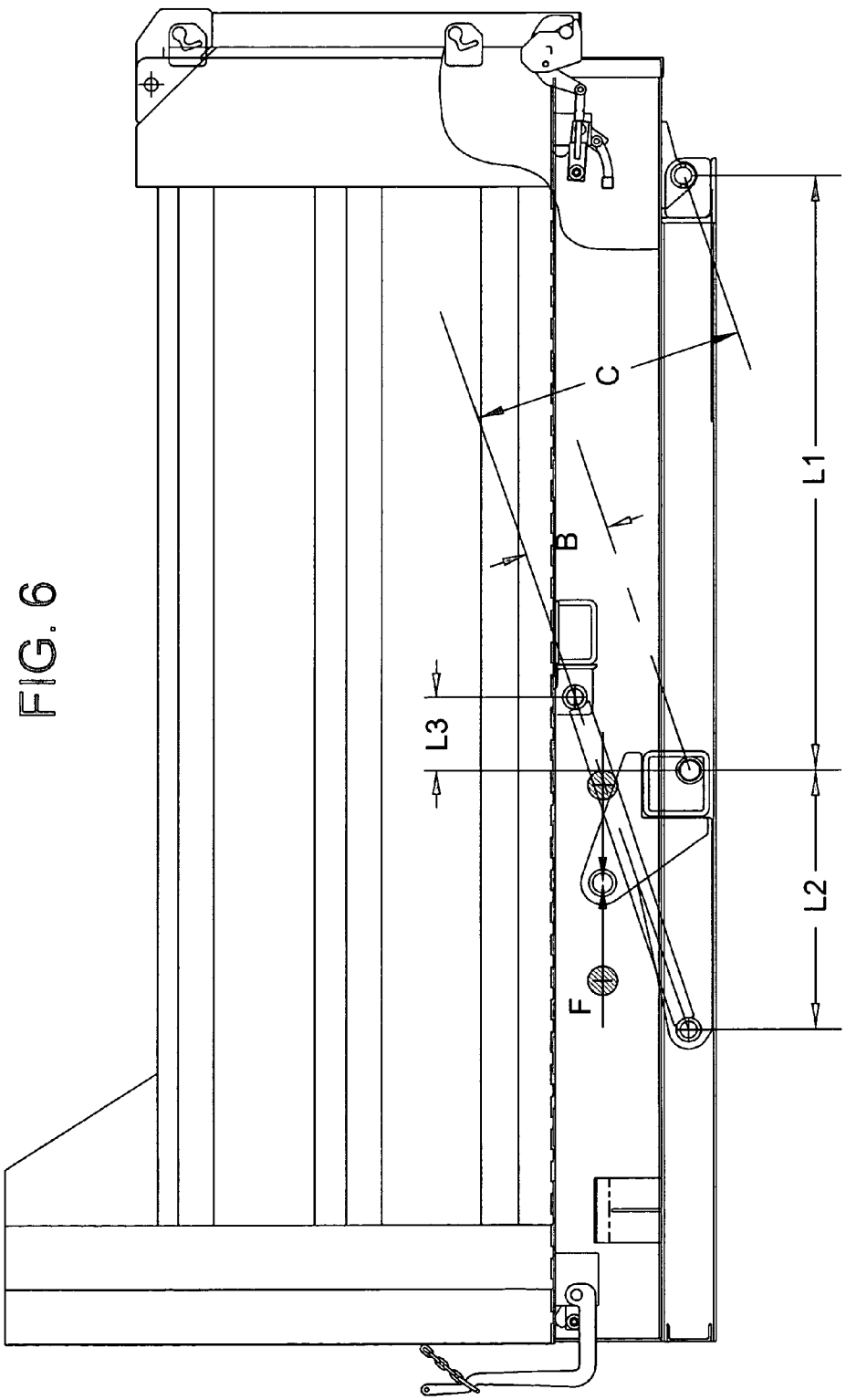
FIG. 6 is an illustrative schematic view of a dump body and chassis of a vehicle.

Referring to FIGS. 6 and 7, it was determined that in a dump body application, the most efficient way to increase the torque generated by a specific force is to increase the c/b ratio. Increasing the value of a is considered to be undesirable above a finite value because of the attendant increase in the center of gravity of the vehicle with such an increase in a.

By increasing the stroke of the hoist actuator, the hoist system can be moved farther from the pivot axis of the body about the chassis. This increase in distance effectively increases the lever arm of the hoist system, thereby increasing the torque supplied by a particular hoist system in moving the body to a dump angle. Furthermore, by locating the hoist system further from the dump body pivot axis, a more stable connection of the body to the chassis is achieved.

Referring to FIG. 9, an illustrative vehicle 20 includes a chassis 22 and a body 24 mounted onto the vehicle chassis 22 for holding materials. The body 24 has a front end 26, a rear end 28 and a pair of sidewalls 30, 32 extending transversely therebetween. The body 24 is secured to an underbody frame 34 and in turn the chassis 22.

Referring to FIG. 10, the body 24 is pivotally mounted to the underbody frame 34 about a pivot axis 36 which extends perpendicular to the length of the body 24. More specifically, the body 24 is connected to the frame 34 by a hinge 38 which allows for pivoting movement about the pivot axis 36.

Referring to FIGS. 11 and 12, a hoist system 40 is provided to move the body 24 from a storage position, as shown in FIG. 11, to a dumping position, as shown in FIG. 12. Preferably the angle of the dumping position is at least 50° to the horizon. The hoist system 40 includes a trunion 42, a support member 44, a push arm 46, and a ball screw actuator. The trunion 42 is pivotally mounted to the support member 44 such that the trunion can rotate about a trunion pivot axis 47. The ball screw actuator can be mounted such that it has a ball screw pivot 48. The ball screw actuator acts as a linear actuator and can be disposed at other locations to provide a lifting force F. The trunion 42 includes an arm 50. The push arm 46 is pivotally mounted to a distal end 52 of the arm 50 and pivotally mounted to the body 24.

To lift the body 24 to the dumping position, the ball screw actuator is operated, which in turn causes the trunion 42 to rotate about the trunion pivot axis 47. A ball screw actuator can be operated to provide both a "push" and a "pull" in that the ball screw can be driven by a motor, either hydraulically or electrically, in either direction to alternately raise the dump body 24 from the storage position and lower the dump body 24 from the dumping position.

FIGS. 16–21 depict other embodiments of a hoist system according to the present invention useful in connection with a vehicle. In other embodiments, the hoist system can have other configurations.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments would become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vehicle comprising:
   a chassis, the chassis including a frame member;
   a body pivotably secured to the chassis at a hinge, the body comprised of front and rear ends having upper and lower edges and first and second side walls having lower edges; and
   a hoist system extending between the body and the chassis for pivoting the body about the hinge between a storage position and a range of dumping positions, the hoist system including a ball screw actuator, a trunion, and a push arm, the ball screw actuator pivotally mounted to the frame member and to the trunion, the trunion pivotally mounted to the frame member, the trunion including an arm with a distal end thereof, the push arm pivotally mounted to the distal end of the arm, and the push arm pivotally mounted to the body.

2. The vehicle according to claim 1 wherein when in at least one of the dumping positions, the dump body defines a dumping angle with respect to the chassis, the dumping angle being at least 50°.

3. The vehicle according to claim 1 wherein the ball screw actuator is actuatable in a first direction and an opposing second direction to selectively move the body toward the dumping positions and toward the storage position, respectively.

\* \* \* \* \*